United States Patent
Ahmed et al.

(10) Patent No.: US 12,438,452 B2
(45) Date of Patent: Oct. 7, 2025

(54) IMPLEMENTING POWER FACTOR CORRECTION WITH SINGLE-STAGE FLYBACK CONVERTERS OPERATING WITH A VARIABLE SWITCHING FREQUENCY

(71) Applicant: Cypress Semiconductor Corporation, San Jose, CA (US)

(72) Inventors: Rashed Ahmed, Cedar Park, CA (US); Harish Subramanya, El Segundo, CA (US); Ganesh Subramaniam, Cupertino, CA (US); Madhan Kumar Kuppaswamy, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 237 days.

(21) Appl. No.: 18/336,695

(22) Filed: Jun. 16, 2023

(65) Prior Publication Data

US 2024/0283352 A1 Aug. 22, 2024

Related U.S. Application Data

(60) Provisional application No. 63/446,994, filed on Feb. 20, 2023.

(51) Int. Cl.
*H02M 3/335* (2006.01)
*H02M 1/00* (2006.01)
*H02M 1/42* (2007.01)
*H02M 3/00* (2006.01)

(52) U.S. Cl.
CPC ....... *H02M 1/4266* (2013.01); *H02M 1/0009* (2021.05); *H02M 1/007* (2021.05); *H02M 3/003* (2021.05); *H02M 3/33515* (2013.01); *H02M 3/33507* (2013.01); *H02M 3/33523* (2013.01)

(58) Field of Classification Search
CPC ...................... H02M 3/33507; H02M 3/33523
See application file for complete search history.

(56) References Cited

U.S. PATENT DOCUMENTS

| | | | | |
|---|---|---|---|---|
| 5,745,359 | A * | 4/1998 | Faulk ................ | H02M 3/33523 363/21.16 |
| 10,193,458 | B2 * | 1/2019 | Quigley ............ | H02M 3/33523 |
| 2014/0078789 | A1 * | 3/2014 | Li ..................... | H02M 3/33507 363/21.16 |
| 2020/0412257 | A1 * | 12/2020 | Rai .................... | H02M 3/33538 |
| 2021/0400789 | A1 * | 12/2021 | Palliyil Chundethodiyil ............. | H05B 45/385 |

* cited by examiner

*Primary Examiner* — Gary A Nash

(57) ABSTRACT

Controlling power factor correction (PFC) in a flyback converter is described. In one embodiment, an apparatus includes a flyback converter configured to operate with a variable switching frequency. The flyback converter includes a signal transformer, a primary side including a primary-side controller coupled to the signal transformer, and a secondary side including a secondary-side controller coupled to the signal transformer. The secondary-side controller is configured at least to cause a control signal to be generated based on a set of parameters. The control signal controls power factor correction (PFC) for the flyback converter.

19 Claims, 7 Drawing Sheets

IMPLEMENTING POWER FACTOR CORRECTION WITH SINGLE-STAGE FLYBACK CONVERTERS OPERATING WITH A VARIABLE SWITCHING FREQUENCY

CROSS-REFERENCE TO RELATED APPLICATION(S)

This application claims the benefit of U.S. Provisional Application No. 63/446,994, filed on Feb. 20, 2023 and entitled "IMPLEMENTING POWER

TECHNICAL FIELD

This disclosure relates to integrated circuits (ICs) that control power delivery to electronic devices.

BACKGROUND

A flyback converter is a system that can generate some direct current (DC) output from a given input provided by a power source. For example, the input can be an alternating current (AC) input provided by an AC source, and the flyback converter can be an AC to DC (AC-DC) flyback converter. As another example, the input can be a DC input provided by a DC source, and the flyback converter can be a DC to DC (DC-DC) flyback converter. Some flyback converters can be used to implement power adapters. For example, a power adapter can be an AC-DC power adapter to convert input AC current or voltage into DC current or voltage usable by an electronic device (i.e., load). As another example, a power adapter can be a DC-DC power adapter to convert input DC current or voltage into DC current or voltage (e.g., to regulate DC current) usable by an electronic device (e.g., by modifying the input DC current or voltage). Power adapters can support power delivery for various types of electronic devices (e.g., such as smartphones, tablets, notebook computers, laptop computers, hubs, chargers, adapters, etc.).

The power factor of a system can be defined as the ratio of the real power absorbed by a load to the apparent power flowing in a circuit. For example, the real power can be the average power representing the capacity of electricity to do work, and the apparent power can be the product of root mean square (RMS) and voltage. A power factor of less than one means that the voltage and current are out of phase. The effects of the phase difference can therefore increase total harmonic distortion (THD) of the input current. For example, THD can be defined as the ratio of the sum of the powers of all harmonic components raised to the power of the fundamental frequency. In power systems, lower THD is associated with lower peak currents, less heating, lower electromagnetic emissions, etc. A negative power factor can be caused by a load generating real power that flows back towards a power source (e.g., a load with a lower power factor can draw more current than a load with a higher power factor, ceteris paribus). The higher currents and associated peak current spikes associated with lower power factors can increase the amount of energy waste and require larger or more expensive equipment to handle.

BRIEF DESCRIPTION OF THE DRAWINGS

The disclosure is illustrated by way of example, and not of limitation, in the figures of the accompanying drawings.

DETAILED DESCRIPTION

Figure 1:
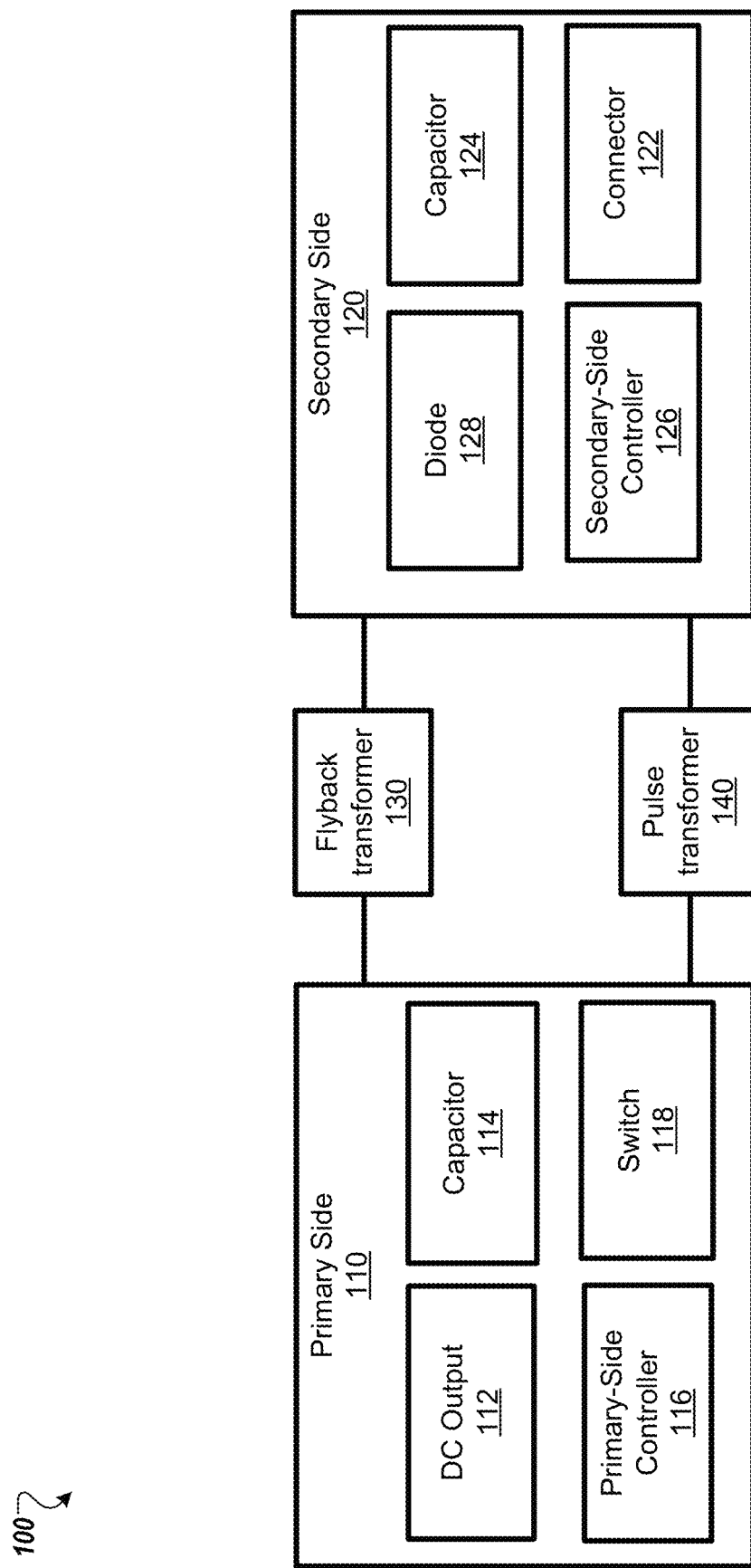
FIG. 1 is a block diagram of a high-level overview of a flyback converter, according to some embodiments.

Described herein are various embodiments of techniques for implementing power factor correction (PFC) with a single-stage flyback converter operating in a variable switching frequency. A flyback converter can include a primary side having a current input including a power source, at least one primary-side capacitor, a primary-side controller, and at least one primary-side switch. For example, the power source can be an AC power source. The at least one primary-side switch can include a power switch. In some embodiments, the power switch is a field-effect transistor (FET). The flyback converter can further include a secondary side having at least one secondary-side switch and at least one secondary-side capacitor, and can include or be coupled to a load. For example, the at least one secondary side switch can include a diode. A flyback transformer separates the primary side from the secondary side to enable galvanic isolation and prevent direct current flow from the primary side to the secondary side. More specifically, the flyback transformer can include a primary-side winding and a secondary-side winding.

The primary side can further include a primary-side controller coupled to the power switch to control operation of the power switch (e.g., turning the power switch on and off). By controlling operation of the power switch, the state of the flyback converter can be controlled to turn power delivery on and off. More specifically, the flyback converter can cycle between an on-state and an off-state.

For example, when the primary-side controller closes the power switch (e.g., turns the FET on), the flyback converter is placed in the on-state. While the flyback converter is in the on-state, the primary-side winding of the flyback transformer is connected to the power source, and a primary current from the power source flows toward the primary-side winding of the flyback transformer. The primary current charges the primary-side winding of the flyback transformer and increases magnetic flux incident on the secondary-side winding of the flyback transformer, which induces a negative electromotive force (emf) in the secondary-side winding of the flyback transformer in accordance with Faraday's law. The diode of the secondary side blocks current flow from the flyback transformer due to reverse-bias resulting from the negative emf. Instead, the at least one secondary-side capacitor can deliver power to a load. When the primary-side controller opens the power switch (e.g., turns the FET off), the flyback converter is placed in the off-state. While the flyback converter is in the off-state, the primary-side winding of the flyback transformer is disconnected from the power source, and the primary current from the power source stops flowing toward the primary-side winding of the flyback transformer. This decreases the magnetic flux incident on the secondary-side winding, which induces a positive emf in the secondary-side winding of the flyback transformer in accordance with Faraday's law. The diode of the secondary side allows a secondary current to flow from the flyback transformer to due forward-bias resulting from the positive emf. This secondary current is used to charge the at least one secondary-side capacitor and deliver power to the load connected to the connector.

In some implementations, the secondary side further includes a secondary-side controller. The secondary-side controller can include a signal generator to generate signals. For example, a signal can include a pulse (e.g., a signal with a rapid rise time, followed by a constant voltage period, and followed by a rapid fall time). In some implementations, the secondary-side controller can utilize pulse-width modulation (PWM) to generate a PWM signal. PWM can be used to control (e.g., reduce) the amplitude of the pulse of the control signal.

In some implementations, the secondary-side controller can communicate control signals to the primary-side controller that can be used to control the power switch. More specifically, a signal transformer can be placed between the primary side and the secondary side, and the secondary-side controller can communicate control signals to the primary-side controller via the signal transformer. For example, the signal transformer can be a pulse transformer. Accordingly, the signal transformer can act as a communication link between the primary-side controller and the secondary-side controller.

The secondary-side controller can operate in accordance with a switching frequency, which can be fixed (e.g., static) or variable (e.g., dynamic). A flyback converter can be configured to operate in one or more operating modes based on the amount of time between receiving control signals in accordance with the switching frequency. The flyback converter may need to be designed to support operation in one or more of the operating modes.

One example of an operating mode is continuous conduction mode (CCM). A flyback converter operates in CCM if the primary-side controller causes the power switch to go from open to closed before the primary-side winding has had enough time to discharge completely. In other words, a control signal to close an open power switch is received by the primary-side controller before complete discharge of the primary-side winding of the flyback transformer. Thus, when operating in CCM, the current in the primary-side winding of the flyback transformer is never zero or near-zero.

Another example of an operating mode is discontinuous conduction mode (DCM). A flyback converter operates in DCM if the primary-side controller causes the power switch to go from open to closed after an amount of time sufficient to completely discharge the primary-side conductor. In other words, a control signal to close an open power switch is received by the primary-side controller after complete discharge of the primary-side winding of the flyback transformer. Thus, when operating in DCM, the current in the primary-side winding of the flyback transformer is zero or near-zero for at least some amount of time. DCM can occur if the duty cycle of the control signal is sufficiently short and/or the load is sufficiently small. A duty cycle refers to the amount of activity period during an on-off cycle for a waveform (e.g., signal) or system. Duty cycle can be determined based on a ratio of active time to total period. In some implementations, the duty cycle is expressed as a ratio (e.g., fraction or decimal). In some implementations, the duty cycle is expressed as a percentage. For example, the duty cycle of a waveform can be determined based on a ratio of a pulse width of the waveform to a total period of the signal.

Operation in DCM can be more efficient than, e.g., in CCM due at least in part to the reduced reverse recovery loss with respect to the diode. The improved efficiency can be achieved assuming that the current through the primary-side winding is efficiently delivered. For example, an appropriate duty cycle can be selected during DCM operation to improve power delivery efficiency. Moreover, flyback converters operating in DCM employ zero-current switching (ZCS) and/or zero-voltage switching (ZVS), which can further improve efficiency. However, DCM can result in larger amounts of electromagnetic interference (EMI) and/or noise as compared to CCM, so flyback converters operating in DCM may require additional circuitry to account for the EMI and/or noise.

Yet another example of an operating mode is a critical conduction mode (CrCM). A flyback converter operates in CrCM if the primary-side controller causes current to be delivered to the primary-side winding of the flyback converter upon complete discharge of the primary-side winding of the flyback converter (e.g., once the current in the primary-side winding of the flyback converter is zero). In other words, the power switch is closed (e.g., turned on) approximately immediately after the primary-side winding of the flyback converter is completely discharged. CrCM can occur by employing an appropriately chosen duty cycle for the control signal that can cause current to be delivered to the primary-side winding of the flyback converter at approximately the correct time after the power switch is opened.

A flyback converter can further optimize operation to achieve circuit protection based on analysis of current and voltage conditions and the detection of faults. In some embodiments, circuit protection includes power factor correction (PFC). To improve resource efficiency and protect the circuitry, PFC can be enabled when the amount of power is sufficiently high (e.g., greater than 75 W). More specifically, PFC can increase the power factor closer to the ideal of 1 during high-power operation. Without implementing PFC, a phase difference may exist between the current and input voltage, which can result in loss and high peak currents. PFC can be used to draw input current in phase with the input voltage. For example, PFC can maintain THD of the input current that is suitable low (e.g., less than or equal to 5% at full load). In some implementations, a flyback converter is implemented within a power adapter. Some power adapters can support a wide power range (e.g., from about 0.1 W to about 100 W). However, a power adapter can remain in a lower power mode for most of the time (e.g., about 80% of the time). Keeping PFC enabled while the power adapter operates in a lower power mode can result in reduced efficiency. Accordingly, although PFC can be beneficial to use during higher-power operations (e.g., greater than 75 W), PFC can be viewed as unnecessary overhead for lower-power operations.

Typically, PFC is controlled by the primary side of a flyback converter. However, the secondary-side controller may have access to more complete information regarding electrical parameters related to the load requirements on the power output. Examples of electrical parameters include output voltage, load current, output power, AC line-in, etc. Accordingly, the secondary-side controller may have access to information that can better optimize PFC. Moreover, some power adapters are designed with a first power processing stage for PFC (e.g., a boost stage), and a second power processing stage for voltage conversion (e.g., a flyback stage). Using two stages can be a waste of resources and can impact PFC efficiency.

Described herein are various embodiments of techniques for implementing PFC with a single-stage flyback converter operating with a variable switching frequency. Embodiments described herein provide flyback converters that are designed to implement both PFC and voltage conversion within a single power processing stage ("stage"). A flyback converter described herein can include a secondary-side controller that generates control signals, to control the operation of the primary side controller and power switch, while operating with the variable switching frequency. For example, while the flyback converter operates with the variable switching frequency, the secondary-side controller can generate a control signal for controlling PFC in accordance with a variable switching frequency. In some embodiments, the secondary-side controller generates control signals while the flyback converter operates in CrCM.

In some embodiments, generating the control signal includes generating a duty cycle. For example, the secondary-side controller can include a resistor divider, a fixed reference voltage, and an error amplifier (e.g., a current error amplifier). The error amplifier can generate an output corresponding to the duty cycle by comparing the fixed reference value to an output reference value provided by the resistor divider. In some embodiments, the secondary-side controller further includes a resistor-capacitor (RC) network. The RC network and the output of the error amplifier can collectively form a compensator. In some embodiments, the compensator is a type-2 compensator.

In some embodiments, generating the control signal includes generating a ramp voltage. For example, the secondary-side controller can include a ramp voltage generator. The ramp voltage generator can include a switch coupled to a timer, a capacitor, and a programmable digital-to-analog converter (DAC). In some embodiments, the programmable DAC is a current DAC. A current DAC can generate an analog signal based on a programmable current with a bit resolution. In some embodiments, the bit resolution is 7 bits. For example, a 7-bit resolution current DAC can have an associated current range between about 0 microamperes (μA) to about 152.4 μA, or a current range between about 0 μA to about 304.8 μA. In some embodiments, the bit resolution is 8 bits. For example, an 8-bit resolution current DAC can have an associated current range between about 0 μA to about 306 μA, or a current range between about 0 μA to about 612 μA. The bit resolution of the current DAC should not be considered limiting.

A DAC controller of the secondary-side controller can control operation of the programmable DAC (e.g., current DAC) based on a set of parameters. More specifically, the DAC controller can be coupled to the programmable DAC. In some embodiments, the DAC controller configures the programmable DAC in accordance with the set of parameters. In some embodiments, the set of parameters includes a power switch close time (e.g., turn-on time). For example, the power switch close time can be achieved by modulating the output current of the current DAC ($I_{DAC}$) (either fixed or feed forward). Accordingly, the power switch close time can be set based on calculations performed inside of the secondary-side controller.

In some embodiments, the set of parameters includes an input voltage ($V_{IN}$), an output voltage ($V_O$), and an output current ($I_O$). For example, the power switch close time can be determined based at least in part on $V_{IN}$, $V_O$, and $I_O$. The set of parameters including $V_{IN}$, $V_O$ and $I_O$ can be determined by the DAC controller based on various input signals. For example, the DAC controller can be connected to a sense node (SR_NODE), and the DAC controller can determine (e.g., estimate) $V_{IN}$ based on a signal received from the sense node. As another example, the DAC controller can be further connected to a resistor divider node located between the resistors of the resistor divider, and the DAC controller can receive $V_O$ from the resistor divider node. As yet another example, the DAC controller can receive $I_O$ from a current sense amplifier that monitors load current. For example, the current sense amplifier can be a low-side current sense amplifier (LSCSA). More specifically, the current sense amplifier can have one input terminal connected to a current sense node located between the secondary-side capacitor and a sense resistor, and another input terminal connected to another current sense node located between the sense resistor and the connector. The current sense amplifier can generate $I_O$ based on signals received from the current sense nodes.

In some embodiments, the control signal is generated based on the analog signal generated by the programmable DAC and the error amplifier signal generated by the error amplifier. For example, the secondary-side controller can further include a comparator that can receive the analog signal generated by the programmable DAC and the error amplifier signal, and generate the control signal having a duty cycle determined in accordance with the error amplifier signal.

In some embodiments, the control signal is sent to the primary-side controller via a signal transformer for PFC control. For example, the primary-side controller can include a comparator connected to both ends of the primary-side winding of the signal transformer, and the output of the comparator of the primary-side controller can control the primary-side power switch (e.g., close or open).

For example, assume that the power switch is opened (e.g., the FET is turned off). A zero-cross detector (ZCD) of the secondary-side controller can detect when the secondary current goes to zero. Upon detecting that the secondary current goes to zero, a ZCD flag can be set (e.g., the ZCD flag can go high). This can cause the secondary-side controller to generate a control signal to close the power switch (e.g., turn the FET on) based on the analog signal generated by the programmable DAC and the error amplifier signal generated by the error amplifier. The waveform of the control signal can have a moving average that is in phase with $V_{IN}$, which can enable PFC to be achieved. Accordingly, embodiments described here can implement PFC with a single-stage flyback converter operating with a variable switching frequency, such as in CrCM. Further details regarding implementing PFC with a single-stage flyback converter operating with a variable switching frequency will be described below with reference to FIGS. 1-6.

In some embodiments, a flyback converter is implemented within a power adapter. For example, the power adapter can be an AC-DC power adapter. Embodiments described herein can also be implemented in other types of power adapters, power converters, power delivery circuits, or the like. A power adapter described herein can include a power control subsystem having hardware, firmware, or any combination. A power adapter described herein can be coupled to electronic devices (e.g., loads) to enable power delivery. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use connectors (interfaces) for communication, battery charging, and/or power delivery. Embodiments described herein can be used for AC-DC power adapters, GaN-based power adapters operating at or above 600 kHz frequencies, power adapters with primary or secondary-side controllers, power adapters operating in modes of operations, such as DCM, CCM, CrCM, quasi-resonant mode (QR), or the like.

In some embodiments, the power adapter is a Universal Serial Bus (USB) Power Delivery (USB-PD) power adapter configured to operate with a USB-enabled electronic device or system. A USB-enabled electronic device or system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C™, is defined in various releases and/or versions of the USB Type-C™ specification (e.g., such as Release 1.0, Release 1.1, etc.). The USB Type-C™ specification defines Type-C™ receptacle, Type-C™ plug, and Type-C™ cables that can support USB communications as well as power delivery over newer USB power delivery protocols defined in various revisions/versions of the USB-PD specification. Examples of USB Type-C™ functions and requirements may include, without limitation, data and other communications according to USB 2.0 and USB 3.0/3.1/3.2, electro-mechanical definitions and performance requirements for Type-C™ cables, electro-mechanical definitions and performance requirements for Type-C™ receptacles, electro-mechanical definitions and performance requirements for Type-C™ plugs, requirements for Type-C™ to legacy cable assemblies and adapters, requirements for Type-C™-based device detection and interface configuration, requirements for optimized power delivery for Type-C™ connectors (also referred to as USB-C connectors), etc.

According to the USB Type-C™ specification(s), a Type-C™ port provides VBUS, D+, D−, GND, SSTX+, SSTX−, SSRX+, and SSRX− lines, among others. In addition, a Type-C™ port also provides a Sideband Use (denoted SBU) line for signaling of sideband functionality and a Configuration Channel (denoted CC) line for discovery, configuration, and management of connections across a Type-C™ cable. A Type-C™ port may be associated with a Type-C™ plug and/or a Type-C™ receptacle. The Type-C™ plug and the Type-C™ receptacle are designed as a reversible pair that operates regardless of the plug-to-receptacle orientation for ease of use. Thus, a standard USB Type-C™ connector, disposed as a standard Type-C™ plug or receptacle, provides pins for four VBUS lines, four ground return (GND) lines, two D+ lines (DP1 and DP2), two D− lines (DN1 and DN2), two SSTX+lines (SSTXP1 and SSTXP2), two SSTX− lines (SSTXN1 and SSTXN2), two SSRX+lines (SSRXP1 and SSRXP2), two SSRX− lines (SSRXN1 and SSRXN2), two CC lines (CC1 and CC2), and two SBU lines (SBU1 and SBU2), among others. Embodiments described herein can be used in power-adapter solutions along with Type-C™ PD capability.

Some USB-enabled electronic devices may be compliant with a specific revision and/or version of the USB-PD specification (e.g., such as Revision 1.0, Revision 2.0, Revision 3.0, etc., or later revisions/versions thereof). The USB-PD specification defines a standard protocol designed to enable the maximum functionality of USB-enabled devices by providing more flexible power delivery along with data communications over a single USB Type-C™ cable through USB Type-C™ ports. The USB-PD specification also describes the architecture, protocols, power supply behavior, parameters, and cabling necessary for managing power delivery over USB Type-C™ cables at up to 10 0W of power. According to the USB-PD specification, devices with USB Type-C™ ports (e.g., USB-enabled devices) may negotiate for more current and/or higher or lower voltages over a USB Type-C™ cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a PD contract that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc. According to the USB-PD specification, an electronic device is typically configured to deliver power to another device through a power path configured on a USB VBUS line.

Advantages of implementing PFC with a single-stage flyback converter operating with a variable switching frequency, as described herein, include improved PFC efficiency, reduced resource consumption, reduced stress on electrical components, increased flexibility, and programmability. Additionally, since PFC is controlled by the secondary-side controller, the primary-side controller can be designed with minimal intelligence. Moreover, having a single-stage flyback converter can reduce the overall footprint of the flyback converter. Accordingly, embodiments described herein can be used to fabricate systems and devices implementing flyback converters (e.g., power adapters) with smaller footprints and less circuitry, which can reduce manufacturing costs and increase efficiency.

FIG. 1 is a block diagram of flyback converter 100, according to some embodiments. In some embodiments, flyback converter 100 is included within a power adapter. For example, the power adapter can be an AC-DC power adapter. For example, the power adapter can be a USB-PD power adapter. In some embodiments, other converters may be used, e.g., a switching converter, or the like.

Flyback converter 100 can include primary side 110, secondary side 120, flyback transformer 130, and pulse transformer 140. As shown, primary side 110 can include DC output component 112, capacitor 114, primary-side controller 116, and switch 118. More specifically, switch 118 is a power switch controllable by primary-side controller 116. In some embodiments, switch 118 is a FET. Secondary side 120 can include (or be coupled to) connector, capacitor 124, secondary-side controller 126, and diode 128. In some embodiments, connector 122 is connected to a load to provide a connection between the load and flyback converter 100. For example, the load can be an electronic device connected to a power adapter implementing flyback converter 100.

Flyback transformer 130 can have a primary-side winding coupled to primary side 110 and a secondary-side winding coupled to secondary side 120. For example, DC output component 112 can be coupled to a first end of the primary-side winding, and switch 118 can be coupled to a second end of the primary-side winding. For example, if switch 118 is a FET, then the second end of the primary winding of flyback transformer 130 can be coupled to a source/drain of switch 118. For example, a first end of the secondary-side winding can be coupled to diode 128, and a second end of the secondary-side winding can be coupled to an output line. Pulse transformer 140 can have a primary-side winding coupled to primary side 110 and a secondary-side winding coupled to secondary side 120.

An example operation of flyback converter 100 will now be described. DC output component 112 can receive an AC input from an AC input source and convert the AC input into a corresponding DC output. Further details regarding DC output component 112 are described below with reference to FIGS. 2A-2B.

Primary-side controller 116 can control operation of switch 118 to control a state of flyback converter 100. For example, when primary-side controller 116 closes switch 118 (e.g., turns the FET on), flyback converter 100 is placed in the on-state. While flyback converter 100 is in the on-state, the DC output generated by DC output component 112 flows toward the primary-side winding of flyback transformer 130. The DC output generated by DC output component 112 charges the primary-side winding of flyback transformer 130 and increases magnetic flux incident on the secondary-side winding of flyback transformer 130, which induces a negative emf in the secondary-side winding of flyback transformer 130 in accordance with Faraday's law. Diode 128 blocks current flow from flyback transformer 130 due to reverse-bias resulting from the negative emf. Instead, capacitor 124 can deliver power to connector 122. When primary-side controller 116 opens switch 118 (e.g., turns the FET off), flyback converter 100 is placed in the off-state. While flyback converter 100 is in the off-state, the primary-side winding of flyback transformer 130, the DC output generated by DC output component 112 stops flowing toward the primary-side winding of flyback transformer 130. This decreases the magnetic flux incident on the secondary-side winding of flyback transformer 130, which induces a positive emf in the secondary-side winding of flyback transformer 130 in accordance with Faraday's law. Diode 128 allows current to flow from flyback transformer 130 to due forward-bias resulting from the positive emf. This secondary current is used to charge capacitor 124 and deliver power to connector 122.

Secondary-side controller 126 can include a signal generator to generate signals. For example, a signal can include a pulse. A pulse can have a fixed width or a variable width. In some embodiments, secondary-side controller 126 utilizes PWM to generate a PWM signal. In some embodiments, secondary-side controller 126 can communicate control signals to primary-side controller 116 that can be used to control switch 118. More specifically, secondary-side controller 126 can communicate control signals to the primary-side controller via signal transformer 140.

Control signals generated by secondary-side controller 126 can, upon receipt by primary-side controller 116, cause primary-side controller 116 to control operation of switch 118. For example, in response to receiving a turn-on control signal, primary-side controller 116 can cause switch 118 to close (e.g., turn on the FET). In response to receiving a turn-off control signal, primary-side-controller 116 can cause switch 118 to open (e.g., turn off the FET). For example, if switch 118 is a FET, then primary-side controller 116 can apply a turn-on voltage (e.g., pulse) to the gate of switch 118 to turn on switch 118 (e.g., cause the source/drain of switch 118 to go low). In some embodiments, the turn-on voltage is about 12V. Primary-side controller 116 can apply a turn-off voltage (e.g., pulse) to the gate of switch 118 to turn off switch 118 (e.g., cause the source/drain of switch 118 to go high).

In some embodiments, primary-side controller 116 includes a comparator or differential amplifier having a pair of input terminals connected to signal transformer 140, and an output terminal connected to switch 118. The comparator can generate an output signal based on a pair of input signals received from signal transformer 140, which can be used to control switch 118.

Secondary-side controller 126 can send any combination of pulses indicating a specific bit pattern to primary-side controller 116, without requiring clock synchronization. In one embodiment, secondary-side controller 126 includes a state machine to synchronize each function of primary-side controller 116 to be programmed (e.g., calibrated, trimmed, or the like). Secondary-side controller 126 can store other information, such as user-defined settings. For example, the user-defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of secondary-side controller 126. Firmware of secondary-side controller 126 can transfer this information to primary-side controller 116 in a similar manner at appropriate times, such as at boot-up or later during the operation of the converter at a specific time. During a no-load case, information regarding the turning on of switch 118 is not required to be sent.

Secondary-side controller 126 can generate control signals in accordance with a switching frequency, which can be fixed (e.g., static) or variable (e.g., dynamic). Flyback converter 100 can be configured to operate in one or more operating modes based on the amount of time between receiving control signals in accordance with the switching frequency. Flyback converter 100 may need to be designed to support operation in one or more of the operating modes. In some embodiments, flyback converter 100 operates with a variable switching frequency. For example, the flyback converter 100 can operate in CrCM.

While flyback converter 100 operates with a variable switching frequency, secondary-side controller 126 can generate a control signal for controlling PFC in accordance with a variable switching frequency. In some embodiments, generating the control signal includes generating a duty cycle. For example, as will be described in further detail below with reference to FIGS. 2A-2B, secondary-side controller 126 can include a resistor divider, a fixed reference voltage, and an error amplifier (e.g., current error amplifier). The error amplifier can generate an output corresponding to the duty cycle by comparing the fixed reference value to an output reference value provided by the resistor divider. In some embodiments, the secondary-side controller further includes an RC network. The RC network and the output of the error amplifier can collectively form a compensator. In some embodiments, the compensator is a type-2 compensator.

In some embodiments, generating the control signal includes generating a ramp voltage. For example, as will be described in further detail below with reference to FIGS. 2A-2B, secondary-side controller 126 can include a ramp voltage generator. The ramp voltage generator can include a switch coupled to a timer, a capacitor, and a programmable digital-to-analog converter (DAC). In some embodiments, the programmable DAC is a current DAC. The current DAC can generate an analog signal based on a programmable current with a bit resolution. In some embodiments, the bit resolution is 7 bits. For example, a 7-bit resolution current DAC can have an associated current range between about 0 microamperes ($\mu A$) to about 152.4 $\mu A$, or a current range between about 0 $\mu A$ to about 304.8 $\mu A$. In some embodiments, the bit resolution is 8 bits. For example, an 8-bit resolution current DAC can have an associated current range between about 0 $\mu A$ to about 306 $\mu A$, or a current range between about 0 $\mu A$ to about 612 $\mu A$. The bit resolution of the current DAC should not be considered limiting.

In some embodiments, the programmable DAC is controlled based on a set of parameters. For example, as will be described in further detail below with reference to FIGS. 2A-2B, secondary-side controller 126 can further include a DAC controller that can control operation of the programmable DAC based on the set of parameters. More specifically, the DAC controller can be coupled to the programmable DAC. In some embodiments, the DAC controller configures the programmable DAC in accordance with the set of parameters. In some embodiments, the set of parameters includes a power switch close time (e.g., turn-on time) of switch 118. For example, the power switch close time can be achieved by modulating the output current of the current DAC ($I_{DAC}$) (either fixed or feed forward). Accordingly, the power switch close time can be set based on calculations performed inside of the secondary-side controller.

In some embodiments, the set of parameters includes an input voltage ($V_{IN}$), an output voltage ($V_O$), and an output current ($I_O$). For example, the power switch close time can be determined based at least in part on $V_{IN}$, $V_O$, and $I_O$. The set of parameters including $V_{IN}$, $V_O$ and $I_O$ can be determined by the DAC controller based on various input signals. For example, the DAC controller can be connected to a sense node (SR_NODE), and the DAC controller can determine (e.g., estimate) $V_{IN}$ based on a signal received from the sense node. As another example, the DAC controller can be further connected to a resistor divider node located between the resistors of the resistor divider, and the DAC controller can receive $V_O$ from the resistor divider node. As yet another example, the DAC controller can receive $I_O$ from a current sense amplifier that monitors load current. For example, the current sense amplifier can be a low-side current sense amplifier (LSCSA). More specifically, the current sense amplifier can have one input terminal connected to a current sense node located between the secondary-side capacitor and a sense resistor, and another input terminal connected to another current sense node located between the sense resistor and the connector. The current sense amplifier can generate $I_O$ based on signals received from the current sense nodes.

In some embodiments, the control signal is generated based on the analog signal generated by the programmable DAC and the error amplifier signal generated by the error amplifier. For example, as will be described in further detail below with reference to FIGS. 2A-2B, secondary-side controller 126 can further include a comparator that can receive the analog signal generated by the programmable DAC and the error amplifier signal, and generate the control signal having a duty cycle determined in accordance with the error amplifier signal.

In some embodiments, the control signal is sent to primary-side controller 116 via signal transformer 140 for PFC control. For example, as will be described in further detail below with reference to FIGS. 2A-2B, primary-side controller 116 can include a comparator connected to both ends of the primary-side winding of signal transformer 140, and the output of the comparator of primary-side controller 116 can control switch 118 (e.g., close or open).

For example, assume that switch 118 is opened (e.g., the FET is turned off). A zero-cross detector (ZCD) of secondary-side controller 126 can detect when the secondary current goes to zero. Upon detecting that the secondary current goes to zero, a ZCD flag can be set (e.g., the ZCD flag can go high). This can cause secondary-side controller 126 to generate a control signal to close switch 118 (e.g., turn the FET on) based on the analog signal generated by the programmable DAC and the error amplifier signal generated by the error amplifier. The waveform of the control signal can have a moving average that is in phase with $V_{IN}$, which can enable PFC to be achieved. Accordingly, flyback converter 100 can implement secondary-side controlled PFC while operating with the variable switching frequency. Further details regarding implementing PFC with a single-stage flyback converter operating with a variable switching frequency will now be described below with reference to FIGS. 2A-2B.

Figure 2A:
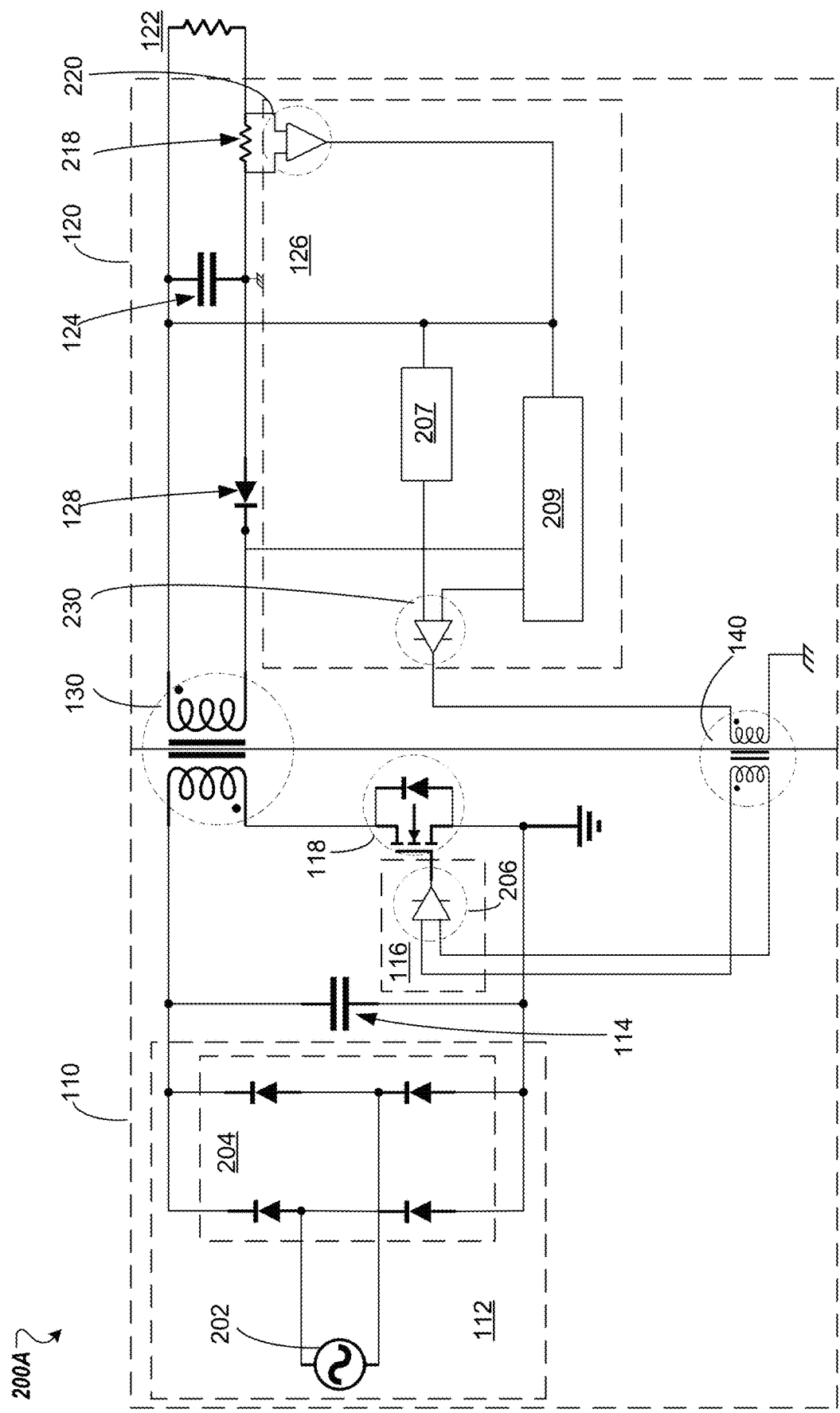
FIGS. 2A-2B are block diagrams of systems implementing flyback converters, according to some embodiments.

FIG. 2A is a block diagram of system 200A, according to some embodiments. In some embodiments, system 200A includes a power adapter. For example, system 200A can include a USB-PD power adapter. System 200A includes a flyback converter, such as flyback converter 100 in FIG. 1. For example, referring back to FIG. 2A, system 200A can include primary side 110 having DC output component 112, at least one capacitor 114, primary-side controller 116, and switch 118. System 200A can further include secondary side 120, which can include or be coupled to connector 122, at least one capacitor 124, secondary-side controller 126, and diode 128. System 200A can further include flyback transformer 130 and signal (e.g., pulse) transformer 140.

Flyback transformer 130 can have any suitable polarity between its primary-side winding and its secondary-side winding. The polarity of a transformer can correspond to a phase-shift implemented by the transformer between its primary-side winding and its secondary-side winding. In some embodiments, and as indicated by the dot orientation, flyback transformer 130 implements 180° phase-shift between the primary-side winding and the secondary-side winding (i.e., current/voltage for both windings rise and fall together).

Signal transformer 140 can have any suitable polarity between its primary-side winding and its secondary-side winding. In some embodiments, and as indicated by the dot orientation, signal transformer implements 0° phase-shift between the primary-side winding and the secondary-side winding (i.e., current/voltage for one winding rises while current/voltage for the other winding falls).

In some embodiments, DC output component 112 can be coupled to AC source 202 providing an AC input. For example, DC output component 112 can include rectifier 204, coupled to AC source 202, to generate a DC output from the AC input received from AC source 202. In some embodiments, rectifier 204 is a bridge rectifier, including a set of diodes. In the illustrative example shown in FIG. 2A, rectifier 204 is a bridge rectifier, including four diodes. However, such an example should not be considered limiting. Accordingly, in some embodiments, system 200A includes an AC-DC power adapter implementing an AC-DC flyback converter. In some embodiments, primary-side controller 116 includes comparator 206.

In some embodiments, secondary-side controller 126 includes amplifier and compensation network 207 that functions as a compensator for voltage mode control. In some embodiments, the compensator is a type-2 compensator. In some embodiments, amplifier and compensation network 207 includes a set of capacitors and a resistor that collectively form an RC network connected across the resistor divider and the output of an error amplifier. Further details regarding amplifier and compensation network 207 will be described below with reference to FIG. 2B.

In some embodiments, secondary-side controller 126 includes ramp voltage generator network 209 to generate a ramp voltage signal ($V_{ramp}$). In some embodiments, ramp voltage generator network 209 includes a switch, a capacitor, a DAC and a DAC controller coupled to the DAC. In some embodiments, the flyback converter operates with a variable switching frequency. For example, the flyback converter can operate in DCM. Thus, in some embodiments, the DAC generates an analog signal based on $V_{ramp}$ and in accordance with a variable switching frequency. For example, secondary-side controller 126 can operate in CrCM. Thus, in some embodiments, DAC 228 generates an analog signal based on $V_{ramp}$ and in accordance with a variable switching frequency. In some embodiments, the DAC is a programmable DAC. For example, the DAC can be a current DAC. Further details regarding ramp voltage generator network 209 will be described below with reference to FIG. 2B.

In some embodiments, system 200A includes sense resistor 218 and current sense amplifier 220 coupled to ramp voltage generator network 209. For example, the DAC controller can be coupled to current sense amplifier 220. In some embodiments, current sense amplifier 230 is an LSCSA. As will be described in further detail below with reference to FIG. 2B, a sense node (SR_NODE) can be coupled to ramp voltage generator network 209 (e.g., the DAC controller).

A first input terminal of comparator 230 (e.g., positive terminal) is connected to the output terminal of error amplifier 212. A second input terminal of comparator 230 (e.g., negative terminal) is connected to the ramp voltage generator. Comparator 230 can generate an output based on the error amplifier signal and $V_{ramp}$. More specifically, the output of comparator 230 can have an associated duty cycle which is set by the output of error amplifier 212.

An output terminal of comparator 230 is connected to a first end of the secondary-side winding of signal transformer 140. A second end of the secondary-side winding can be connected to ground. In response to receiving the output of comparator 230, signal transformer 140 can generate, with respect to primary side 116, a control signal in accordance with Faraday's law that travels to primary-side controller 116. More specifically, comparator 206 has a pair of input terminals connected to respective ends of the primary-side winding of signal transformer 140, and an output terminal connected to switch 118. Based on the control signal, primary-side controller 116 can cause switch 118 to close or open (e.g., turn on or off, respectively), which controls the state of the flyback converter (e.g., on-state or off-state, respectively).

For example, assume that switch 118 is opened (e.g., the FET is turned off). A zero-cross detector (ZCD) of secondary-side controller 126 can detect when the secondary current goes to zero. Upon detecting that the secondary current goes to zero, a ZCD flag can be set (e.g., the ZCD flag can go high). This can cause comparator 230 to generate a control signal to close switch 118 (e.g., turn the FET on) based on the analog signal generated by the DAC 228 and the error amplifier signal generated by error amplifier 212. The waveform of the control signal can have a moving average that is in phase with $V_{IN}$, which can enable PFC to be achieved. Accordingly, system 200A can include a flyback converter implementing secondary-side controlled PFC while operating with a variable switching frequency (e.g., in CrCM).

Figure 2B:
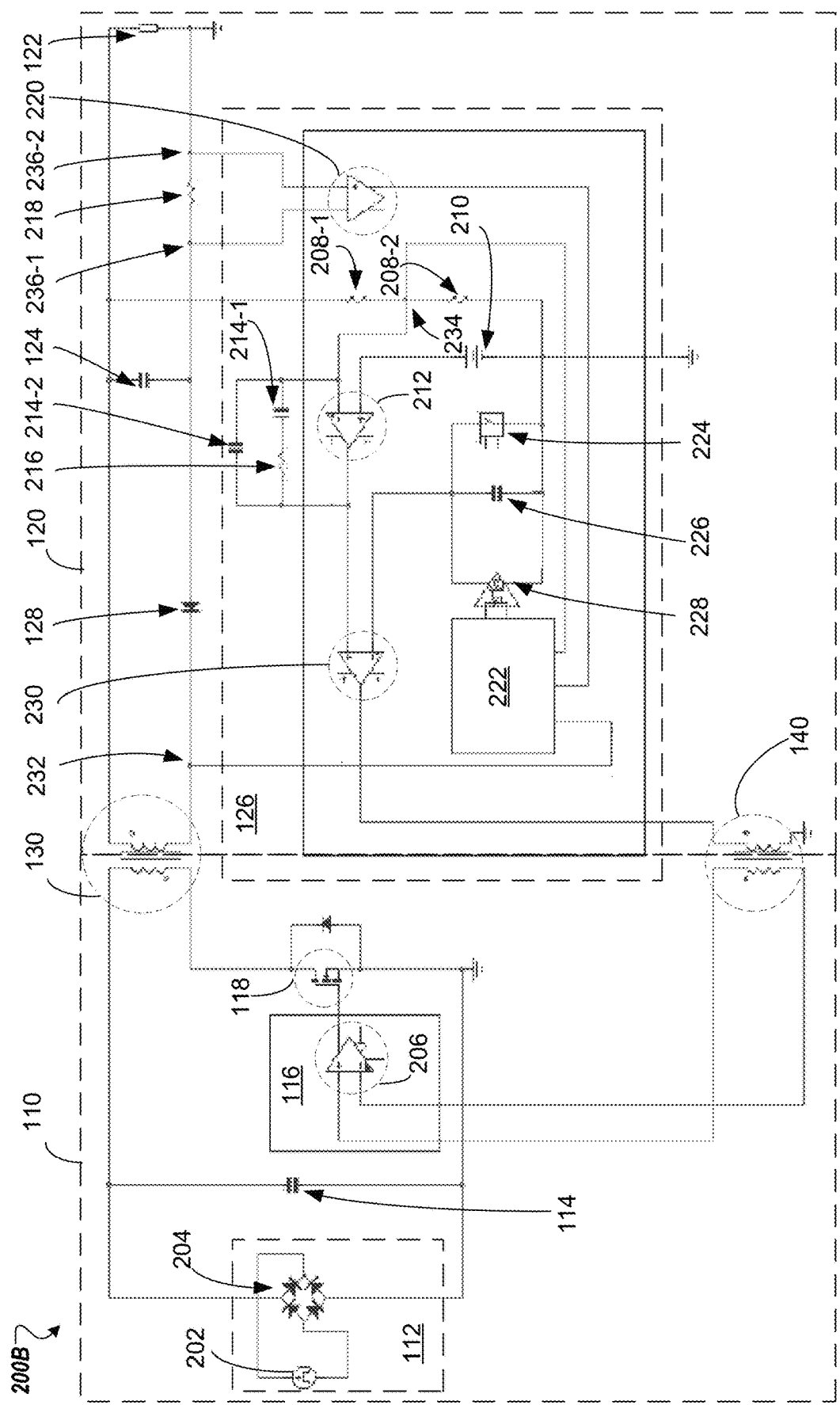

FIG. 2B is a block diagram of system 200B, according to some embodiments. In some embodiments, system 200B includes a power adapter. For example, system 200B can include a USB-PD power adapter. System 200B includes a flyback converter, such as flyback converter 100 in FIG. 1. For example, referring back to FIG. 2B, system 200B can include primary side 110 having DC output component 112, at least one capacitor 114, primary-side controller 116, and switch 118. System 200B can further include secondary side 120, which can include or be coupled to connector 122, at least one capacitor 124, secondary-side controller 126, and diode 128. System 200B can further include flyback transformer 130 and signal (e.g., pulse) transformer 140.

Flyback transformer 130 can have any suitable polarity between its primary-side winding and its secondary-side winding. The polarity of a transformer can correspond to a phase-shift implemented by the transformer between its primary-side winding and its secondary-side winding. In some embodiments, and as indicated by the dot orientation, flyback transformer 130 implements 180° phase-shift between the primary-side winding and the secondary-side winding (i.e., current/voltage for both windings rise and fall together).

Signal transformer 140 can have any suitable polarity between its primary-side winding and its secondary-side winding. In some embodiments, and as indicated by the dot orientation, signal transformer implements 0° phase-shift between the primary-side winding and the secondary-side winding (i.e., current/voltage for one winding rises while current/voltage for the other winding falls).

In some embodiments, DC output component 112 can be coupled to AC source 202 providing an AC input. For example, DC output component 112 can include rectifier 204, coupled to AC source 202, to generate a DC output from the AC input received from AC source 202. In some embodiments, rectifier 204 is a bridge rectifier, including a set of diodes. In the illustrative example shown in FIG. 2B, rectifier 204 is a bridge rectifier, including four diodes. However, such an example should not be considered limiting. Accordingly, in some embodiments, system 200B includes an AC-DC power adapter implementing an AC-DC flyback converter.

In some embodiments, primary-side controller 116 includes comparator 206. In some embodiments, secondary-side controller 126 includes resistor 208-1 and resistor 208-2, reference voltage ($V_{ref}$) 210, error amplifier 212 having a pair of input terminals and an output terminal, capacitors 214-1 and 214-2, resistor 216, sense resistor 218, current sense amplifier 220, DAC controller 222 coupled to an output terminal of current sense amplifier 220, switch 224, capacitor 226, DAC 228 coupled to DAC controller 222, comparator 230, sense node (SR_NODE) 232 coupled to DAC controller 222, resistor divider node 234 located between resistor 208-1 and resistor 208-2 and coupled to DAC controller 222, and current sense node 236-1 and current sense node 236-2 each coupled to a respective input terminal of current sense amplifier 220. In some embodiments, current sense amplifier 230 is an LSCSA.

For example, resistor 208-1, resistor 208-2, $V_{ref}$ 210, error amplifier 212, capacitor 214-1, capacitor 214-2, and resistor 216 can be components of amplifier and compensation network (e.g., amplifier and compensation network 207 of FIG. 2A). Resistors 208-1 and 208-2 form a resistor divider. In some embodiments, the resistor divider is a feedback resistor divider. More specifically, the resistor divider can generate a scaled version of the DC output by attenuating the DC output, and multiplying the attenuated DC output by an output feedback voltage. A first input terminal of error amplifier 212 (e.g., negative terminal) is connected to the resistor divider. A second input terminal of error amplifier 212 (e.g., positive terminal) is connected to $V_{ref}$ 210. Error amplifier 212 can generate an error amplifier signal via an output terminal by comparing the scaled version of the DC output against $V_{ref}$ 210. In some embodiments, error amplifier 212 is a current error amplifier. Capacitor 214-1, capacitor 214-2, and resistor 216 collectively form an RC network. The RC network is connected across the resistor divider and the output of error amplifier 212. The RC network can function as a compensator for voltage mode control. In some embodiments, the compensator is a type-2 compensator.

DAC controller 222, switch 224, capacitor 226, and DAC 228 can be components of a ramp voltage generator network for generating a ramp voltage signal ($V_{ramp}$) (e.g., ramp voltage generator network 209 of FIG. 2A). In some embodiments, the flyback converter operates with a variable switching frequency. For example, secondary-side controller 126 can operate in CrCM. Thus, in some embodiments, DAC 228 generates an analog signal based on $V_{ramp}$ and in accordance with a variable switching frequency.

More specifically, DAC 228 can be a programmable DAC. In some embodiments, DAC 228 is a current DAC. For example, DAC 228 can generate an analog signal based on a programmable current with a bit resolution. In some embodiments, the bit resolution is 7 bits. For example, a 7-bit resolution current DAC can have an associated current range between about 0 µA to about 152.4 µA, or a current range between about 0 µA to about 304.8 µA. In some embodiments, the bit resolution is 8 bits. For example, an 8-bit resolution current DAC can have an associated current range between about 0 µA to about 306 µA, or a current range between about 0 µA to about 612 µA. The bit resolution of the current DAC should not be considered limiting.

DAC 228 can be controlled based on a set of parameters. More specifically, DAC controller 222 can control operation of DAC 228 based on the set of parameters. In some embodiments, DAC controller 222 configures DAC 228 in accordance with the set of parameters. In some embodiments, the set of parameters includes a power switch close time (e.g., turn-on time) of switch 118. For example, the power switch close time can be achieved by modulating the output current of the current DAC ($I_{DAC}$) (either fixed or feed forward). Accordingly, the power switch close time can be set based on calculations performed inside of the secondary-side controller.

In some embodiments, the set of parameters includes an input voltage ($V_{IN}$), an output voltage ($V_O$), and an output current ($I_O$). At least $V_{IN}$ can be represented as a function of time. The set of parameters including $V_{IN}$, $V_O$ and $I_O$ can be determined by DAC controller 222 based on various input signals. For example, DAC controller 222 can determine (e.g., estimate) $V_{IN}$ based on a signal received from the SR_NODE 232. In some embodiments, $V_{IN}$ is determined as a trigonometric function having a frequency corresponding to ω, and an amplitude corresponding to a peak voltage ($V_{pk}$) (e.g., $V_{pk} \times \sin(\omega t)$). As another example, DAC controller 222 can receive $V_O$ from resistor divider node 234. As yet another example, DAC controller 222 can receive $I_O$ from current sense amplifier 220. More specifically, current sense amplifier 220 can generate $I_O$ based on signals received from current sense node 236-1 and current sense node 236-2.

The power switch close time (e.g., turn-on time) can be determined based at least in part on $V_{IN}$, $V_O$, and $I_O$. In some embodiments, the power switch close time can then be determined based at least in part on a power function, $V_{IN}$ and a duty cycle function. For example, $V_O$ and $I_O$ can be used to determine a power function as a trigonometric function having a frequency corresponding to ω, and an amplitude corresponding to the product of $V_O$ and $I_O$ (e.g., $V_O \times I_O \times (1-\cos(2\omega t))$). As another example, $V_{IN}$ and $V_O$ and be used to determine a duty cycle function based on a ratio of a multiple of $V_O$ and a sum of the multiple of $V_O$ and $V_{IN}$.

A first input terminal of comparator 230 (e.g., positive terminal) is connected to the output terminal of error amplifier 212. A second input terminal of comparator 230 (e.g., negative terminal) is connected to the ramp voltage generator. Comparator 230 can generate an output based on the error amplifier signal and $V_{ramp}$. More specifically, the output of comparator 230 can have an associated duty cycle which is set by the output of error amplifier 212.

An output terminal of comparator 230 is connected to a first end of the secondary-side winding of signal transformer 140. A second end of the secondary-side winding can be connected to ground. In response to receiving the output of comparator 230, signal transformer 140 can generate, with respect to primary side 116, a control signal in accordance with Faraday's law that travels to primary-side controller 116. More specifically, comparator 206 has a pair of input terminals connected to respective ends of the primary-side winding of signal transformer 140, and an output terminal connected to switch 118. Based on the control signal, primary-side controller 116 can cause switch 118 to close or open (e.g., turn on or off, respectively), which controls the state of the flyback converter (e.g., on-state or off-state, respectively).

For example, assume that switch 118 is opened (e.g., the FET is turned off). A zero-cross detector (ZCD) of secondary-side controller 126 can detect when the secondary current goes to zero. Upon detecting that the secondary current goes to zero, a ZCD flag can be set (e.g., the ZCD flag can go high). This can cause comparator 230 to generate a control signal to close switch 118 (e.g., turn the FET on) based on the analog signal generated by the DAC 228 and the error amplifier signal generated by error amplifier 212. The waveform of the control signal can have a moving average that is in phase with $V_{IN}$, which can enable PFC to be achieved. Accordingly, system 200B can include a flyback converter implementing secondary-side controlled PFC while operating with a variable switching frequency (e.g., in CrCM).

Figure 3:
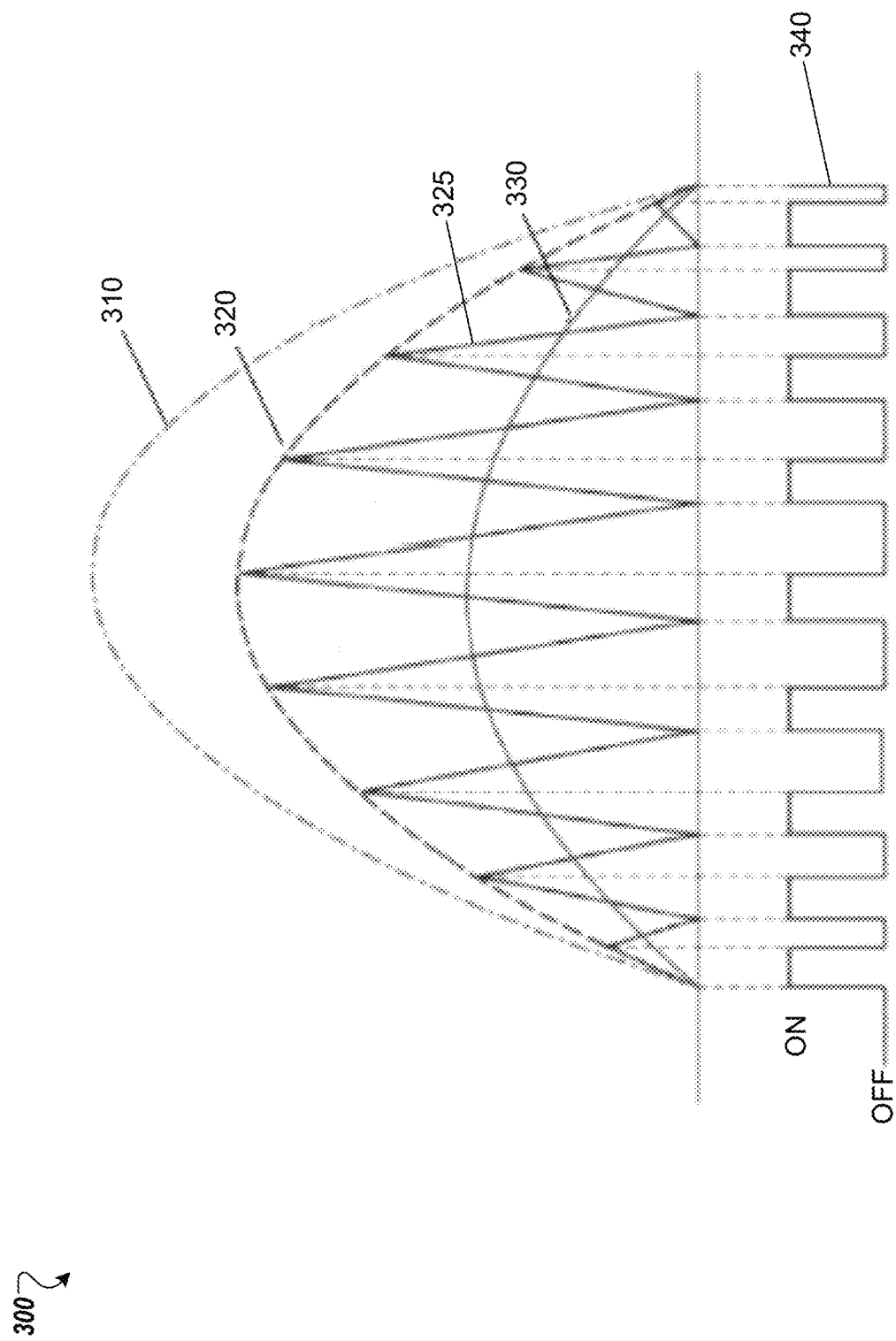
FIG. 3 is a diagram illustrating a control signal protocol for power factor correction (PFC), according to some embodiments.

FIG. 3 illustrates an example graph 300 plotting $V_{IN}$ 310, primary current ($I_{primary}$) 320 modeling $I_{primary}$ waveform 325, and average current ($I_{average}$) 330 during on and off periods of a power switch (e.g., switch 118) as indicated by variable-frequency waveform 340.

Figure 4:
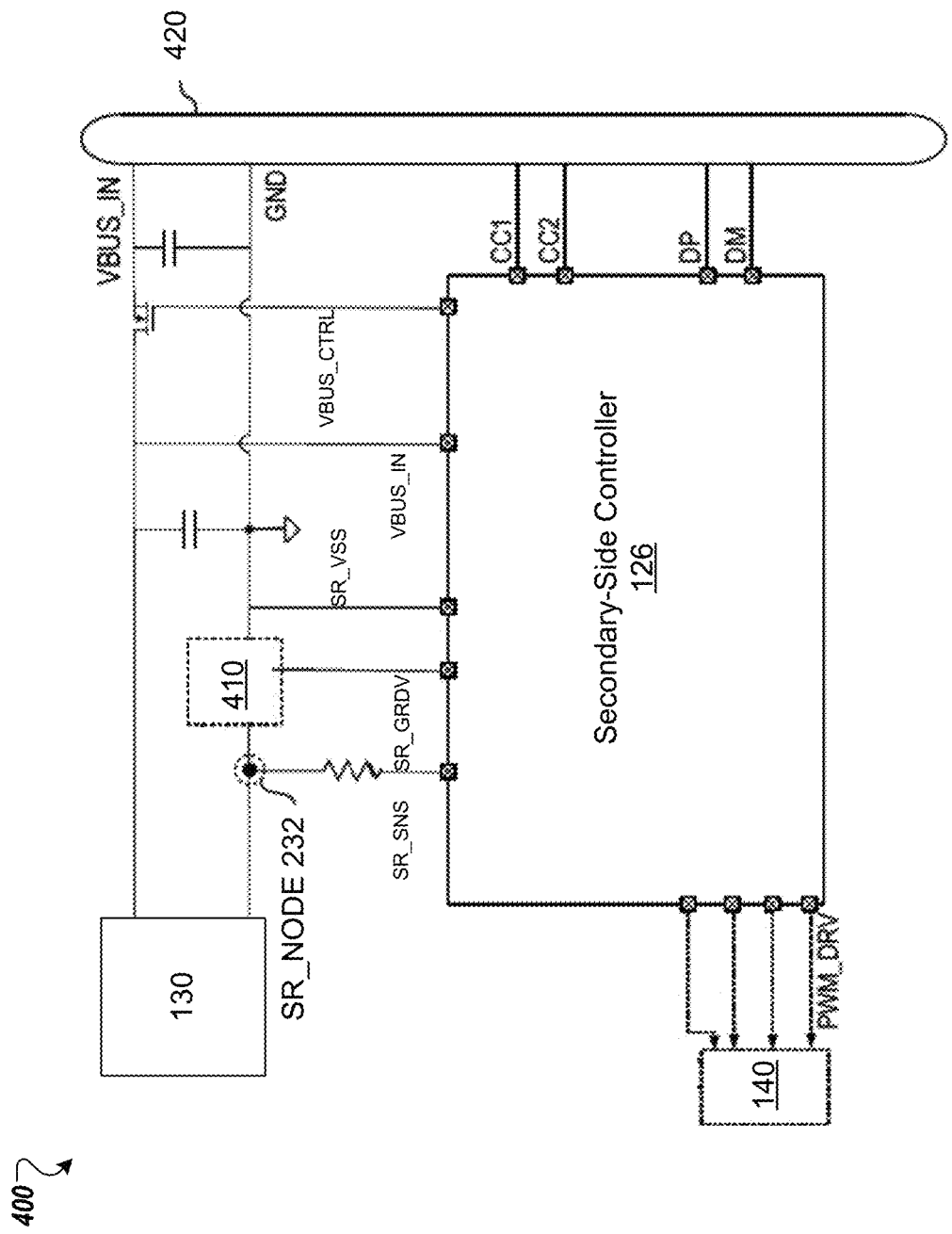
FIG. 4 is a schematic diagram of an example secondary side circuitry of a power adapter, according to some embodiments.

FIG. 4 is a schematic diagram of an example portion of a system 400 implementing a flyback converter, according to some embodiments. More specifically, the portion of the system includes a secondary side of the flyback converter. In some embodiments, system 400 includes a power adapter. For example, system 400 can include a USB-PD power adapter. As shown, system 400 can include secondary-side controller 126, flyback transformer 130, and signal transformer 140, as described above with reference to FIGS. 1-2.

Moreover, system 400 can further include switch component 410. In some embodiments, switch component 410 includes a diode (e.g., diode 128 of FIGS. 1-2). Additionally, switch component 410 can include a transistor (e.g., FET). System 400 can further include SR_NODE 232. For example, if the transistor of switch component 410 is a FET, then SR_NODE 232 can be a drain node (SR_DRAIN).

As further shown, system 400 can further include connector 420. The secondary side of the flyback converter can include, or be coupled to, connector 440. In some embodiments, connector 420 is a USB connector. For example, connector 420 can be a USB Type-C™ connector.

Secondary-side controller 126 may be disposed as an integrated circuit (IC) chip that includes a subsystem configured in accordance with the techniques for PFC control described herein. Secondary-side controller 126 can negotiate a PD contract with a consumer electronic device ("consumer device") (not shown) attached to connector 420 and control. Connector 420 is typically associated with a plug (e.g., USB Type-C™ plug), but it should be understood that, in various embodiments, connector 420 may be associated with a receptacle instead (e.g., USB Type-C™ receptacle).

Secondary-side controller 126 can be coupled to a VBUS_IN line and is configured to control the operation and state of power switches when fault conditions are detected by providing control signals to the gate of the switches. VBUS_IN line can include a provider switch configured as an on/off switch device controlled by signals from an output pin ("VBUS_Control") of a gate driver in secondary-side controller 126. The provider switch can include a FET. On one side of the provider switch, a power source node on the VBUS_IN line can be coupled to flyback transformer 130, which is coupled to a large bulk capacitor configured to remove the AC component of the power signal. A power source node can be coupled to an input pin ("VBUS_IN" pin) of secondary-side controller 126. An output node on the VBUS_IN line is coupled to connector 420 and another input pin ("VBUS_CTRL" pin) of secondary-side controller 126.

In operation, the direction of power flow on the VBUS_IN line is from flyback transformer 130 to the consumer device that is attached to connector 420. When a PD contract with the consumer device is negotiated, secondary-side controller 126 can cause power to be provided to the consumer device at the negotiated voltage and/or current level(s) (e.g., via the provider switch). A high-to-low voltage transition on the VBUS_IN line may be needed when the PD contract is dynamically re-negotiated to lower the VBUS voltage and/or current, e.g., when the consumer device has finished charging its battery and now needs power only to operate.

On detection of fault conditions, a control signal may be sent to disconnect connector 420 from the flyback transformer 130. For example, the provider switch can be turned off by driving the output of VBUS_CTRL to zero. This disconnection may be caused by an over-voltage condition, an over-current condition, or other conditions that may require disconnection of connector 420 from the flyback transformer 130 for protection of circuits coupled to connector 420.

Embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, an SBPD device is a USB-PD device that is compatible with the USB-PD standard or, more generally, with the USB standard. For example, the SBPD device may provide an output voltage (e.g., VBUS, power supply voltage) based on an input voltage (e.g., VBUS, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OVP (over-voltage protection), UVP (under-voltage protection), OCP (over current protection), SCP (short circuit protection), PFC (power factor correction), SR (synchronous rectification), ACF (active clamp flyback), or the like. The information can include fault information for any of these different functions.

In other embodiments, the SBPD device is connected to a power source, such as a wall socket power source that provides input power. For example, a power source can be an AC source that provides AC input. In other embodiments, the power source may be a different power source, such as a battery, and may provide DC power to the SBPD device. The power converter may convert the power received from the power source (e.g., convert power received to VBUS). For example, a power converter may be an AC-DC converter and convert AC power from the power source to DC power. In some embodiments, the power converter is a flyback converter, such as a secondary-controlled flyback converter, that provides galvanic isolation between the input (e.g., primary-side) and the output (e.g., secondary-side). For example, the secondary-controlled flyback converter may be a single-ended forward converter. In some embodiments, feed-forward information on the secondary-side can be used to limit the maximum duty cycle that can be passed to the primary-side FET. The maximum duty cycle may change with line voltage.

In some embodiments, the SBPD device provides VBUS to a sink device (e.g., via a configuration channel (CC) specifying a particular output voltage, and possibly an output current). SBPD device may also provide access to ground potential (e.g., ground) to the sink device. In some embodiments, the providing of the VBUS is compatible with the USB-PD standard. Power control analog subsystem may receive VBUS from the power converter. The power control analog subsystem may output VBUS. In some embodiments, the power control analog subsystem is a USB Type-C™ controller compatible with the USB Type-C™M standard. The power control analog subsystem may provide system interrupts responsive to the VBUS and/or VBUS_CTRL.

In some embodiments, any of the components of the SBPD device may be part of an IC, or alternatively, any of the components of the SBPD device may be implemented in its own IC. For example, the power converter and power control analog subsystem may be discrete ICs with separate packaging and pin configurations.

In some embodiments, the SBPD device may provide a complete USB Type-C™ and USB-PD port control solution for notebooks, dongles, monitors, docking stations, power adapters, vehicle chargers, power banks, mobile adaptors, and the like.

Figure 5:
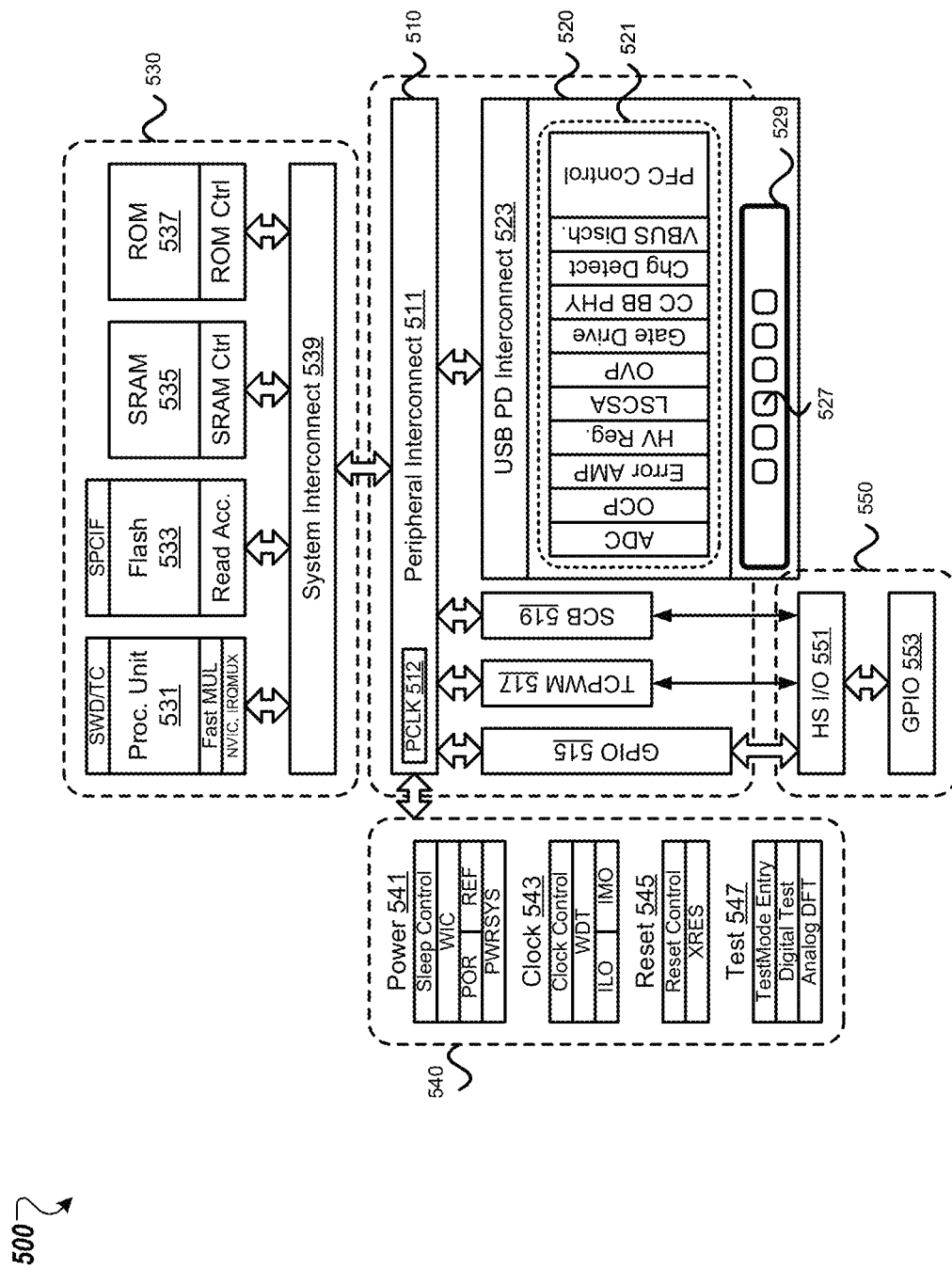
FIG. 5 is a block diagram illustrating an integrated circuit (IC) system for use in power delivery, according to some embodiments.

FIG. 5 is a block diagram illustrating an integrated circuit (IC) system 500 for a USB-enabled device for use in USB power delivery, according to some embodiments. System 500 may include a peripheral subsystem 510, including a number of components for use in USB Power Delivery (USB-PD). Peripheral subsystem 510 may include a peripheral interconnect 511, including a clocking module and a peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, central processing unit (CPU) subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general-purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still, other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect 511 and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) regulating the output voltage on the VBUS_IN line per a PD contract; a high-voltage (HV) regulator for converting the power source voltage to a precise voltage (such as 3.5-5V) to power system 500; a low-side current sense amplifier (LSCSA) for measuring load current accurately, an over-voltage protection (OVP) module and an over-current protection (OCP) module for providing over-current and over-voltage protection on the VBUS_IN line with configurable thresholds and response times; one or more gate drivers for external power field-effect transistors (FETs) used in USB power delivery in provider and consumer configurations; and a communication channel PHY (CC BB PHY) module for supporting communications on a Type-C™ configuration channel (CC) line. USB-PD modules 521 may also include a charger detection module for determining that a charging circuit is present and coupled to system 500 and a VBUS discharge module for controlling the discharge of voltage on VBUS. The discharge control module may be configured to couple to a power source node on the VBUS_IN line or to an output (power sink) node on the VBUS_IN line and to discharge the voltage on the VBUS_IN line to the desired voltage level (i.e., the voltage level negotiated in the PD contract). USB power delivery subsystem 520 may also include pads 527 for external connections and electrostatic discharge (ESD) protection circuitry 529, which may be required on a Type-C™ port. USB-PD modules 521 may also include a communication module for retrieving and communicating information, such as control signals from a secondary-side controller to a primary-side controller.

GPIO 515, TCPWM 517, and SCB 519 may be coupled to an input/output (I/O) subsystem 550, which may include a high-speed (HS) I/O matrix 551 coupled to a number of GPIOs pins 553. GPIOs 515, TCPWM 517, and SCB 519 may be coupled to GPIOs pins 553 through HS I/O matrix 551.

System 500 may also include a central processing unit (CPU) subsystem 530 for processing commands, storing program information, and storing data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during the operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus, such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and power system (PWRSYS) module. In some embodiments, power module 541 may include circuits that allow system 500 to draw and/or provide power from/to external sources at different voltage and/or current levels and support controller operation in different power states, such as active, low-power, or sleep. In various embodiments, more power states may be implemented as system 500 throttles back operation to achieve a desired power consumption or output. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In other embodiments, separate-die circuits may be packaged into a multi-chip module.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the single-stage, secondary-side controlled techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that provides power over USB Type-A and/or Type-C™ port(s). In another example embodiment, system 500 may be disposed and configured in a power bank that can get charged and then provide power to another electronic device over a USB Type-A or Type-C™ port. In other embodiments, a system like system 500 may be configured with power switch control circuitry and may be disposed in various other USB-enabled electronic or electro-mechanical devices.

It should be understood that a system, like system 500 implemented on or as an IC controller, may be disposed into different applications, which may differ with respect to the type of power source being used and the direction in which power is being delivered. For example, in the case of a mobile power adapter, the power source is an AC wall socket. Further, in the case of a PC power adapter, the flow of power delivery is from a provider device to a consumer device, while in the case of a power bank, the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6:
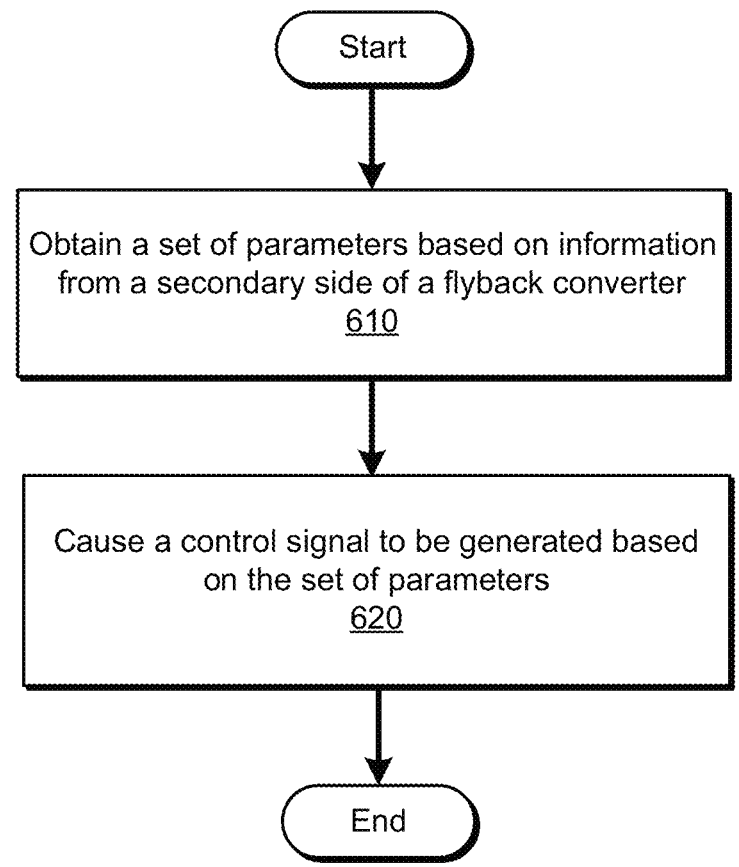
FIG. 6 is a flow diagram of a method of implementing power factor correction (PFC) with a single-stage flyback converter operating with a variable switching frequency, according to some embodiments.

FIG. 6 is a flow diagram of a method 600 of implementing PFC with a single-stage flyback converter operating with a variable switching frequency, according to some embodiments. Method 600 may be performed by processing logic that comprises hardware (e.g., circuitry, dedicated logic, programmable logic, microcode, etc.), software, firmware, or a combination thereof. In some embodiments, a secondary-side controller of a flyback converter performs method 600 (e.g., secondary-side controller 126 of FIGS. 1, 2, and 4). For example, method 600 can be performed by DAC controller 222. In some embodiments, peripheral subsystem 510 of FIG. 5 performs method 600.

At operation 610, processing logic obtains a set of parameters based on information from a secondary side of a flyback converter. For example, a processing device can obtain the set of parameters. In some embodiments, the processing device is a DAC controller (e.g., DAC controller 222 of FIG. 2).

In some embodiments, initializing the ramp voltage generator includes configuring the programmable DAC in accordance with a set of configuration settings for generating an analog signal corresponding to a ramp voltage. For example, the set of configuration settings for the programmable DAC can be determined based on a set of parameters including a target ramp voltage. For example, the set of parameters can include a capacitance of the capacitor of the ramp voltage generator, and the variable switching frequency. In some embodiments, the set of configuration settings includes a current setting for a current DAC ($I_{DAC}$).

In some embodiments, the set of parameters includes an input voltage ($V_{IN}$), an output voltage ($V_O$), and an output current ($I_O$). At least $V_{IN}$ can be represented as a function of time. The set of parameters including $V_{IN}$, $V_O$ and $I_O$ can be determined by a DAC controller based on various input signals. For example, the DAC controller can determine (e.g., estimate) $V_{IN}$ based on a signal received from the SR_NODE 232. In some embodiments, $V_{IN}$ is determined as a trigonometric function having a frequency corresponding to $\omega$, and an amplitude corresponding to a peak voltage ($V_{pk}$) (e.g., $V_{pk} \times \sin(\omega t)$). As another example, the DAC controller can receive $V_O$ from a resistor divider node. As yet another example, the DAC controller can receive $I_O$ from a current sense amplifier. More specifically, the current sense amplifier can generate $I_O$ based on signals received from a pair of current sense nodes.

The power switch close time (e.g., turn-on time) can be determined based at least in part on $V_{IN}$, $V_O$, and $I_O$. In some embodiments, the power switch close time can then be determined based at least in part on a power function, $V_{IN}$ and a duty cycle function. For example, $V_O$ and $I_O$ can be used to determine a power function as a trigonometric function having a frequency corresponding to $\omega$, and an amplitude corresponding to the product of $V_O$ and $I_O$ (e.g., $V_O \times I_O \times (1-\cos(2\omega t))$). As another example, $V_{IN}$ and $V_O$ and be used to determine a duty cycle function based on a ratio of a multiple of $V_O$ and a sum of the multiple of $V_O$ and $V_{IN}$.

At operation 620, processing logic causes a control signal to be generated based on the set of parameters. For example, a processing device can cause a programmable DAC of a ramp voltage generator to generate an analog signal based on a ramp voltage. In some embodiments, the ramp voltage generator further includes a capacitor, and a switch control operation of the ramp voltage generator in accordance with a variable switching frequency. In some embodiments, the programmable DAC is a current DAC. A current DAC can generate an analog signal based on a programmable current with a bit resolution. In some embodiments, the bit resolution is 7 bits. For example, a 7-bit resolution current DAC can have an associated current range between about 0 µA to about 152.4 µA, or a current range between about 0 µA to about 304.8 µA. In some embodiments, the bit resolution is 8 bits. For example, an 8-bit resolution current DAC can have an associated current range between about 0 µA to about 306 µA, or a current range between about 0 µA to about 612 µA. The bit resolution of the current DAC should not be considered limiting.

The control signal can be used to control PFC for the flyback converter. In some embodiments, the control signal is generated while the flyback converter operates in with a variable switching frequency. For example, while the flyback converter operates with the variable switching frequency, the control signal can be generated in accordance with a variable switching frequency. In some embodiments, the flyback converter operates in CrCM.

In some embodiments, the control signal is generated based on the analog signal generated by the programmable DAC and an error amplifier signal generated by an error amplifier. In some embodiments, the error amplifier is a current error amplifier. More specifically, the analog signal can define the ramp voltage, and the error amplifier signal can define the duty cycle. For example, a comparator of the secondary-side controller can receive the analog signal generated by the programmable DAC and the error amplifier signal, and generate the control signal having the duty cycle. The error amplifier can generate the error amplifier signal by comparing a fixed reference value to an output reference value provided by a resistor divider. For example, the fixed reference voltage can be obtained from a reference voltage source. In some embodiments, the secondary-side controller further includes an RC network. The RC network and the error amplifier signal can collectively form a compensator. In some embodiments, the compensator is a type-2 compensator. Further details regarding operations 610-620 are described above with reference to FIGS. 1-5.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The preceding description sets forth numerous specific details, such as examples of specific systems, components, methods, and so forth, in order to provide a good understanding of various embodiments of the techniques described herein for single-stage flyback converters supporting variable switching frequency power factor correction, such as used in USB power delivery applications. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. An apparatus comprising:
a flyback converter configured to operate with a variable switching frequency, the flyback converter comprising:
a signal transformer;
a primary side comprising a primary-side controller coupled to the signal transformer; and
a secondary side comprising a secondary-side controller coupled to the signal transformer, wherein the secondary-side controller is configured at least to cause a control signal to be generated based on a set of parameters, and wherein the control signal controls power factor correction (PFC) for the flyback converter;
wherein the flyback converter is a single-stage flyback converter operating with the variable switching frequency in a critical conduction mode (CrCM).

2. The apparatus of claim 1, wherein the secondary-side controller further comprises a ramp voltage generator comprising a programmable digital-to-analog converter (DAC) coupled to a DAC controller configured to generate, based on the set of parameters, an analog signal corresponding to the control signal.

3. The apparatus of claim 2, wherein the programmable DAC is a current DAC.

4. The apparatus of claim 2, wherein the secondary-side controller further comprises an error amplifier configured to generate an error amplifier signal, and wherein the control signal is further generated based on the error amplifier signal.

5. The apparatus of claim 4, wherein the secondary-side controller further comprises a comparator configured to receive the analog signal and the error amplifier signal, and generate the control signal to have a duty cycle defined by the error amplifier signal.

6. The apparatus of claim 4, wherein the secondary-side controller further comprises a resistor divider, and wherein the error amplifier is configured to generate the error amplifier signal by comparing a fixed reference value to an output reference value provided by the resistor divider.

7. The apparatus of claim 4, wherein the secondary-side controller further comprises a compensator comprising a resistor-capacitor (RC) network and the error amplifier signal.

8. The apparatus of claim 2, wherein the secondary-side controller is further configured to initialize the ramp voltage generator of the secondary-side controller by configuring the programmable DAC in accordance with a set of configuration settings for generating the analog signal.

9. The apparatus of claim 2, wherein the set of parameters comprises an input voltage determined by the DAC controller based on a signal received from a sense node, an output voltage received by the DAC controller from a node of a resistor divider, and an output current received by the DAC controller from a current sense amplifier coupled to a pair of current sense nodes.

10. The apparatus of claim 1, wherein:
the flyback converter further comprises a flyback transformer coupled between the primary side and the secondary side;
the primary side further comprises a power switch; and
the secondary side further comprises a diode.

11. The apparatus of claim 10, wherein the primary-side controller comprises a comparator having a pair of input terminals coupled to a primary-side winding of the signal transformer, and an output terminal coupled to the power switch.

12. The apparatus of claim 1, wherein the apparatus comprises a Universal Serial Bus Power Delivery (USB-PD) power adapter.

13. The apparatus of claim 1, further comprising a rectifier to generate a direct current (DC) output based on an alternating current (AC) input received from an AC source.

14. A method comprising:
initializing a ramp voltage generator of a secondary-side controller of a Universal Serial Bus Power Delivery (USB-PD) flyback converter configured to operate with a variable switching frequency, wherein the USB-PD flyback converter further comprises a signal transformer coupled to the secondary-side controller, and a primary-side controller coupled to the signal transformer; and
causing a control signal to be generated based on a set of parameters, wherein the control signal controls power factor correction (PFC) for the USB-PD flyback converter.

15. The method of claim 14, wherein causing the control signal to be generated further comprises causing the control signal to be generated based on an analog signal received from a ramp voltage generator comprising a programmable digital-to-analog converter (DAC) coupled to a DAC controller, and an error amplifier signal from an error amplifier of the secondary-side controller, wherein the analog signal is generated based on the set of parameters, and wherein the control signal has a duty cycle defined by the error amplifier signal.

16. The method of claim 15, wherein initializing the ramp voltage generator further comprises configuring the programmable DAC in accordance with a set of configuration settings for generating the analog signal.

17. The method of claim 15, wherein the set of parameters comprises an input voltage determined by the DAC controller based on a signal received from a sense node, an output voltage received by the DAC controller from a node of a resistor divider, and an output current received by the DAC controller from a current sense amplifier coupled to a pair of current sense nodes.

18. The method of claim 15, wherein the USB-PD flyback converter is a single-stage flyback converter operating with the variable switching frequency in a critical conduction mode (CrCM).

19. A power adapter comprising:
a rectifier configured to generate a direct current (DC) output based on an alternating current (AC) input received from an AC source; and a flyback converter configured to operate with a variable switching frequency, the flyback converter comprising:
  a flyback transformer;
  a signal transformer;
  a primary side comprising:
    a primary-side controller coupled to the flyback transformer and the signal transformer; and
    a power switch coupled to the primary-side controller; and
  a secondary side comprising a secondary-side controller coupled to the flyback transformer and the signal transformer, wherein the secondary-side controller is configured at least to cause a control signal to be generated based on a set of parameters, and wherein the control signal controls power factor correction (PFC) for the flyback converter;
  wherein the flyback converter is a single-stage flyback converter operating with the variable switching frequency in a critical conduction mode (CrCM).

* * * * *